Figure 1:
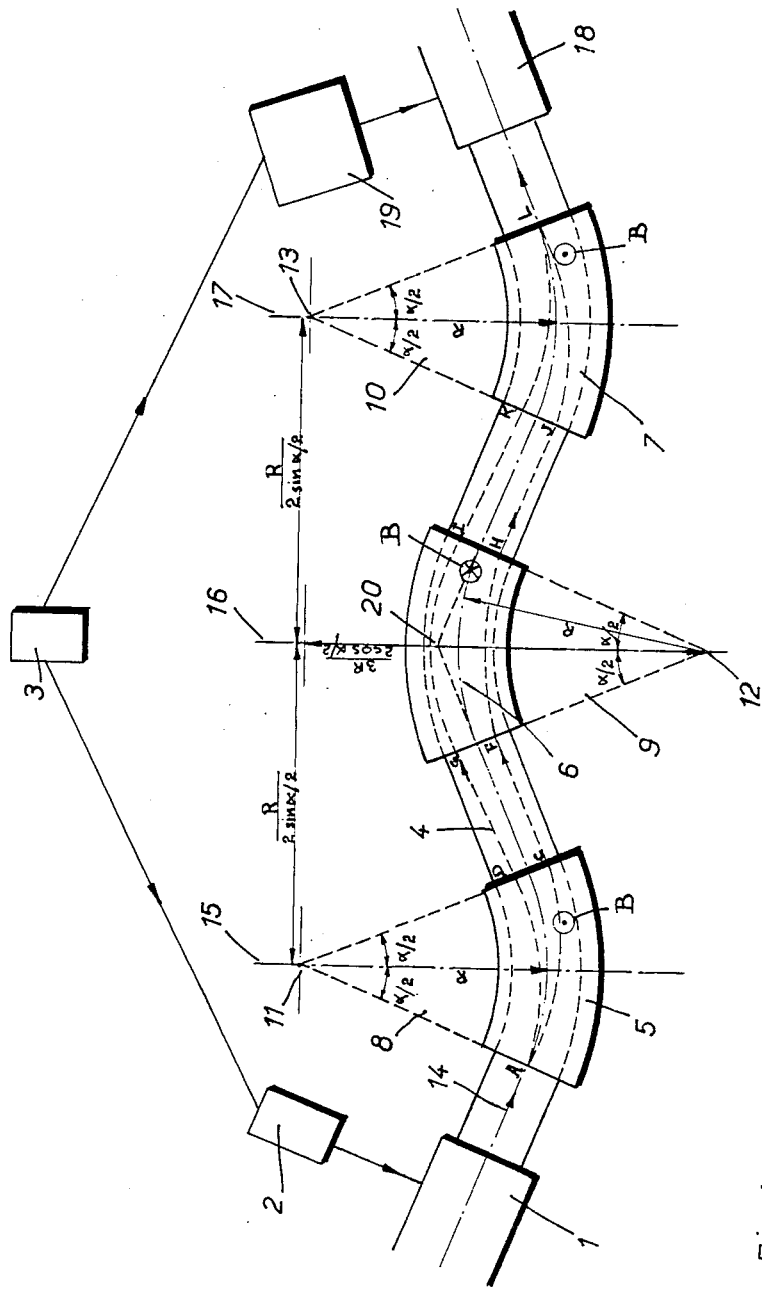

April 24, 1962 H. P. LEBOUTET ETAL 3,031,596
DEVICE FOR SEPARATING ELECTRONS IN ACCORDANCE
WITH THEIR ENERGY LEVELS
Filed March 9, 1959 3 Sheets-Sheet 1

INVENTORS
H. P. LEBOUTET
et JP PINEL
BY Craig and Freudenberg
ATTORNEYS

April 24, 1962  H. P. LEBOUTET ET AL  3,031,596
DEVICE FOR SEPARATING ELECTRONS IN ACCORDANCE
WITH THEIR ENERGY LEVELS
Filed March 9, 1959  3 Sheets-Sheet 2

INVENTORS
H.P. LEBOUTET
et J.PINEL
BY Craig and Freudenberg
ATTORNEYS

United States Patent Office 3,031,596
Patented Apr. 24, 1962

3,031,596
DEVICE FOR SEPARATING ELECTRONS IN ACCORDANCE WITH THEIR ENERGY LEVELS
Hubert P. Leboutet and Jacques P. Pinel, Paris, France, assignors to Compagnie Generale de Telegraphie sans Fil, Paris, France
Filed Mar. 9, 1959, Ser. No. 798,010
Claims priority, application France Mar. 13, 1958
27 Claims. (Cl. 315—3.5)

The present invention relates to a magnetic separator device for electrons of an electron beam having different energies.

It is known in the prior art that the linear electron accelerators provide at the output thereof an electron beam containing electrons of different energies, the energy spectrum being of the order of 5–10% of the average energy level.

Furthermore, oftentimes the need arises in actual use to separate these electrons according to the energy thereof, either for measuring the relative quantities thereof for purposes of quantitative spectrum analysis, for the utilization of a predetermined energy level or of a definite portion of the spectrum with respect to such a level, or to subject the electrons to a subsequent treatment tending to equalize the energy level thereof in order to obtain finally a mono-energy beam.

Since the electrons leaving a linear accelerator move practically with the speed of light, it is hardly possible to effectuate the separation thereof on the basis of the difference in the speed thereof.

The present invention aims at an electron separator which effectuates the separation on the basis of difference of length in the path of trajectory effectuated by the electrons of different energies between the output of the accelerator and a predetermined point in space.

According to the present invention, this difference in the length of the trajectory or path of the electrons is caused by passing the electrons through an assembly of magnetic fields disposed in space and having predetermined characteristics, the totality of these magnetic fields constituting a magnetic separator having the property of being strictly afocal, i.e., without focusing properties, in the plane perpendicular to that plane in which the length of the electron trajectory or path is influenced, and to compensate within this latter plane the focusing of the beam by a defocusing arrangement in such a manner that the beam at the output of the separator has the same geometric form or configuration as the beam applied to the input thereof.

According to a first embodiment of a separator of the present invention, the separator includes three sources of magnetic field having an intensity B, this intensity being the same for the end sources and either the same or not the same for the intermediate source of the magnetic field. These magnetic field sources act successively on the beam from the output of the accelerator transversely to the trajectory or path thereof, the lines of force of these three fields being parallel among each other but that of the intermediate or middle field being opposed to the lines of force of the end fields.

Each of the three fields exerts its action on the beam within the limits of a sector having essentially the same angle of aperture $\alpha$ and essentially the same radius R for the end sources, and either also the same values or not the same values of $\alpha$ and R for the intermediate source. The radius R is defined as radius of curvature of the trajectory or path of the electrons of average energy level E under the action or influence of the magnetic field B.

The values of R and B are interrelated with each other by the following equation:

$$B \cdot R = \frac{E}{3} \cdot 10^4 \qquad (1)$$

where E is the energy of the electrons in mev., B the field intensity in gauss, and R the radius expressed in centimeters.

The sources of the magnetic fields conforming to the characteristics mentioned hereinabove may be realized in practice by pole pieces of sector shape.

In the case in which the electron input beam is cylindrical, and assuming for the intermediate source the same values of $\alpha$, R and B as for the end sources, these three sources are placed in space in the following manner, described herein only for illustrative purposes and as a first approximation, it being understood that the exact position thereof may be adjusted experimentally by being guided by the result to be attained thereby.

The first source is placed in such a manner that the beam at the output of the accelerator arrives with an incidence perpendicular with respect to the input radius of the first sector of magnetic field action. This condition determines the angle $$\frac{\pi}{2} - \frac{\alpha}{2}$$

between the incidence direction of the beam and the plane of symmetry of the first sector. The axis of the beam arrives at the incidence at a distance R from the center of the circle out of which is cut the first sector.

The plane of symmetry of the second sector is parallel to that of the first sector. It passes through the point in which the electrons of the same energy, equal to the average energy and leaving the first sector would be focused in the absence of the second sector. This condition provides numerically the distance between the planes of symmetry which is equal to $$\frac{R}{2 \sin \frac{\alpha}{2}}$$

The third sector is disposed in such a manner as to form an image of the first with respect to the plane of symmetry of the second. The distance between the plane of symmetry thereof and that of the second sector is, therefore, equal to $$\frac{R}{2 \sin \frac{\alpha}{2}}$$

and the corresponding centers of their circles are located on one and the same straight line perpendicular to the plane of symmetry.

Finally, the center of circle corresponding to the second sector is situated at a distance $$\frac{3R}{2 \cos \frac{\alpha}{2}}$$

from this last-mentioned straight line. It is, of course, located within the plane of symmetry of the second sector and within the plane common to all the sectors.

According to a preferred construction, the angle $\alpha$ is chosen to be equal to 41° 30', approximately corresponding to $\cos \alpha = 0.75$.

A second modification of the separator according to the present invention includes four magnets, disposed and dimensioned in a manner which is only slightly different.

According to a further feature of the present invention, the beam leaving the separator and composed of chaplets of electron bunches having successively different energies is submitted within a second linear accelerator of the travelling-wave-type to a field acting as accelerator on certain electron bunches and as decelerator on other in such a manner that the energies of all the electron bunches are equalized to an identical average level, and that the beam supplied by this accelerator is mono-energetic.

Accordingly, it is an object of the present invention to provide an electron separator for high-energy electron beams in which the electrons of different energy levels are magnetically separated.

Another object of the present invention is to provide a separator for high-energy electron beams which is simple in construction, effective in operation, and which can be made so as to be completely afocal, i.e., non-focusing in the overall effect thereof on the beam.

A further object of the present invention is the provision of a separator for high-energy electrons which effectively separates the electrons according to their different energy levels by means of magnetic fields in such a manner as to enable the production of a mono-energetic electron beam by subjecting the previously-separated electrons to the further action of a traveling wave interaction therewith.

Figure 2:
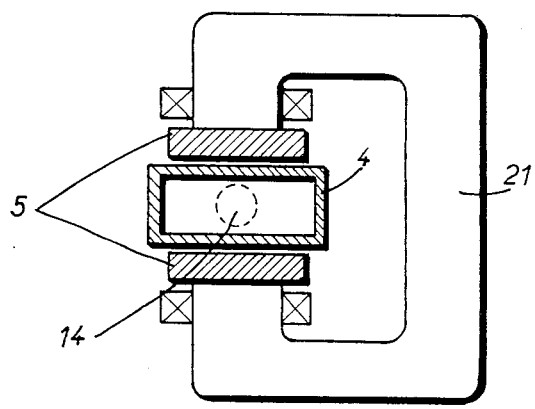
Figure 4:
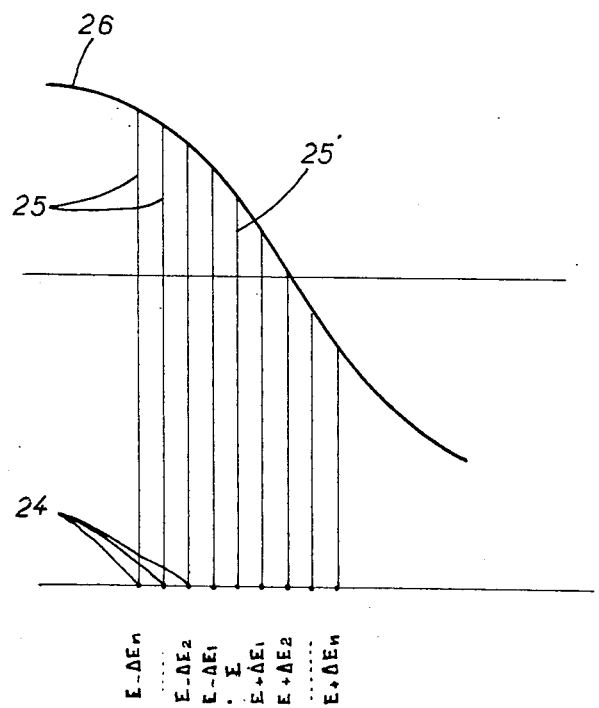
Figure 3:
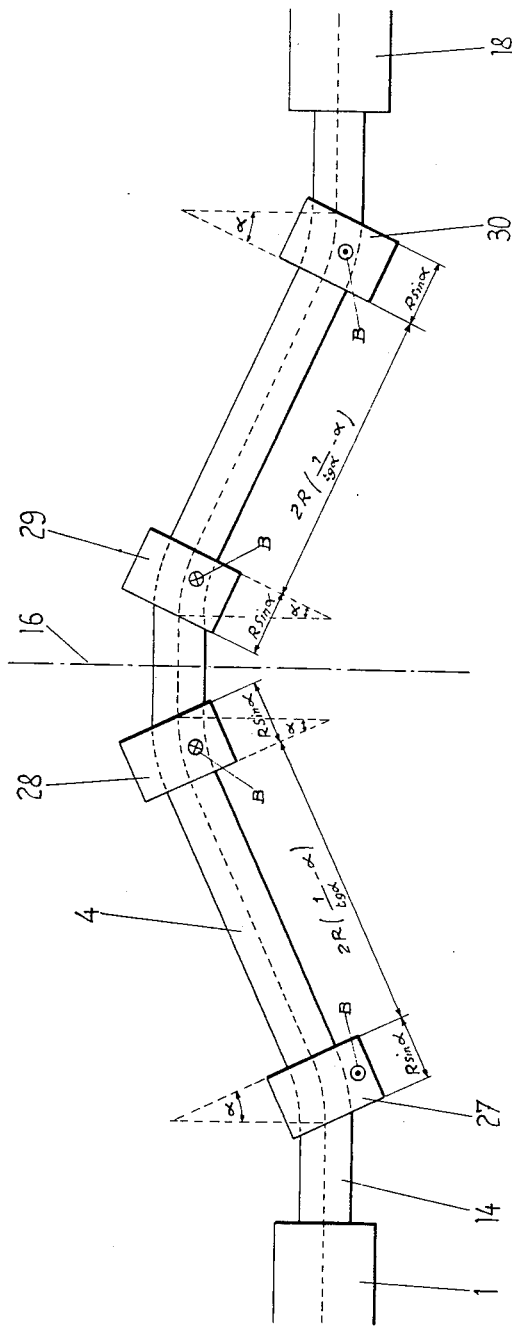

These and other objects, features and advantages of the present invention will become more obvious from the following description when taken in connection with the accompanying drawing which shows, for purposes of illustration only, two embodiments in accordance with the present invention, and wherein:

FIGURE 1 is a plan view of an installation according to the present invention including a magnetic separator having three magnets disposed along the path of the beam between a linear accelerator and an output or load circuit, FIGURE 2 is a vertical transverse across sectional view through one pair of the pole pieces of the separator in accordance with the present invention in a plane essentially transverse to the electron beam, FIGURE 3 is a plan view similar to FIGURE 1 of a modified embodiment of an installation in accordance with the present invention of a separator having four magnets, and FIGURE 4 is a schematic diagram showing the relationship between the fields and the electron bunches in the output accelerator as used in accordance with the present invention.

Referring now to the drawing wherein like reference numerals are used throughout the various views to designate like parts, and more particularly to FIGURE 1 thereof, reference numeral 1 schematically designates therein a linear travelling-wave-type accelerator, shown only in block in the drawing, which may be of any known conventional construction and the details of which are, therefore, dispensed with herein. The accelerator 1 is excited from a high frequency source 2 which, for example, may be an amplifier in turn connected with the input thereof to the ouput of a pilot oscillator 3.

The interior space of an evacuated conduit 4 having an undulating or wave-like shape is connected to the output of the accelerator 1, the conduit 4 being composed alternately of linear portions and portions forming arcs of circles. The portions of the evacuated line 4 forming the arcs of circles are thereby disposed in three transverse magnetic fields of intensity B, for example, the same for the three magnetic fields and produced respectively by the pole pieces 5, 6 and 7 of sector shape, each of these reference numerals designating a pair of superposed pole pieces shown in vertical cross section in FIGURE 2 and illustrating, for example, the cross section of the pole pieces 5 connected with a magnetic circuit 21 of any suitable construction. This shape determines the action of each magnetic field within the limits of a sector having an angle of aperture $\alpha$, for example, the same for the three sectors. The consecutive sectors of FIGURE 1 are designated by reference numerals 8, 9 and 10 respectively. The circles corresponding to these sectors 8, 9 and 10 have their respective centers at 11, 12 and 13. The axis 14 of the beam at the ouput of the accelerator 1 assumed cylindrical in cross section is curved about these centers 11, 12 and 13 with a radius R which is the same in the three cases since the field intensity B is also assumed the same. The values of B and R are selected in accordance with equation (1) as a function of the energy E of the electrons which are moving along the axis of the beam. For example, for $E=40$ mev., the values of $B=3000$ gauss and $R=45$ centimeters may be used.

In the arrangement illustrated in FIGURE 1, the centers 11 and 13 are disposed towards the left and the center 12 toward the right with respect to an observer displacing himself with the electrons along the beam. In order to obtain under these conditions the desired curvature of the trajectory or path, it is necessary that the fields in the sectors 8 and 10 are opposed to that in the sector 9 and that they are directed toward the observer in the first two cases and away from the observer toward the plane of the drawing in the third case. This means that in each of the pair of pole pieces 5 and 7 the south pole is disposed above the north pole whereas it is opposite for the pair of pole pieces 6. These conditions have been symobolically represented in FIGURE 1 by the small circles B in each of the sectors, thereby indicating the direction of the magnetic field by conventional designations.

The pair of pole pieces 5 is disposed with respect to the accelerator in such a manner that the axis of the beam 14 is perpendicular to the input radius of the sector 8. It follows therefrom that the plane of symmetry 15 of the pole pieces 5 is displaced by an angle of $$\frac{\alpha}{2}$$

with respect to this input radius and by an angle of $$\frac{\pi}{2}-\frac{\alpha}{2}$$

with respect to the initial direction of the axis 14.

The pair of pole pieces 6 is disposed in such a manner that the plane of symmetry 16 is parallel to the plane of symmetry 15 and at a distance therefrom equal to $$\frac{R}{2 \sin \frac{\alpha}{2}}$$

and that the center 12 of the circle thereof is at a distance of $$\frac{3R}{2 \cos \frac{\alpha}{2}}$$

from the normal or perpendicular from the center 11 with respect to the plane 16.

Finally, the pair of pole pieces 7 is disposed in a mirror-image like manner to the pair of pole pieces 5 with respect to the plane of symmetry 16, that is, the plane of symmetry 17 thereof is parallel to and at a distance of $$\frac{R}{2 \sin \frac{\alpha}{2}}$$

from the plane 16, and the centers 11 and 13 are located on the same normal or perpendicular to the planes 15, 16 and 17.

At the output of the sector 10, the conduit 4 continues through a rectilinear portion which is connected to the input of a utilization or load apparatus, for example, of a linear accelerator 18, excited from a source 19 which may be controlled by the same pilot oscillator 3 as the source 2.

Operation

The operation of the separator illustrated in FIGURE 1 is as follows:

For the sake of simplicity, the following will be limited to a consideration of a stream of accelerated electrons which are bunched and occupy essentially the axis 14 of the beam. Each bunch of electrons is constituted by a mixture of electrons of different energies, falling within the values of $E+\Delta E_{max}$ and $E-\Delta E_{max}$. These bunches enter the sector 8 at A where the trajectories or paths thereof are curved by the magnetic field B with different radii of curvature by reason of their different energy levels. It may be readily ascertained from Equation 1 that that radius of curvature is directly proportional to the energy. Thus, the trajectories or paths of the electrons having the greatest energy level $E+\Delta E_{max}$ are curved or bent with a larger radius of curvature along the arc AC whereas the paths of the electrons having the smallest level $E-\Delta E_{max}$ are curved or bent with a smaller radius of curvature along the arc AD. The electrons of intermediate energies follow intermediate lines or streams disposed between these two trajectories, and those of average energy E follow the arc of the circle with a radius R.

It may be thus seen that the magnetic field B of the first sector has transformed the electron stream 14 into a divergent beam of electron streams of which each corresponds to a predetermined energy value, this beam leaving the sector 8 between C and D.

It is known that the system of magnetic field formed within the sector 8 behaves as a magnetic lens in such a manner that if there were no pole pieces 6 and if all the electrons of the beam including those within the axis 14 as well as those outside thereof had the same energy, these electrons would be focused in the plane of the sector 8 at a point 20 situated along the extension of the rectilinear portion of the axis 14 after leaving the sector 8.

Calculations demonstrate that the distance between the point 20 and the plane 15 is equal to $$\frac{R}{2 \sin \frac{\alpha}{2}}$$

in such a manner that the plane of symmetry 16 is disposed to pass precisely through this focusing point.

Owing to this arrangement, the magnetic system formed within the sector 9 offers the property that those particular streams of the beam which diverge linearly while leaving from points C and D and which enter into the sector 9 between points G and F describe, on the inside of the sector 9, arcs of circles which are symmetrical with respect to the plane 16. It is thus that the electrons of which the energy is greatest follow the arc of circle FH and those of which the energy is smallest are deviated along an arc of circle GI.

It should be noted that the arc GI is longer than the arc FH because, on the one hand, the arc GI is disposed on the outside of the arc FH with respect to the center of circle 12, and, on the other, because the arc GI is described with a radius of curvature which is smaller than the arc FH by reason of the smaller energy of the corresponding electrons.

The beam is, therefore, located at the output of the sector 9 between points H and I which are respectively symmetrical to points F and G but leaves the same as a convergent beam. The magnetic field of the second sector 9 has thus transformed the divergent beam into a convergent beam.

By reason of the symmetry with respect to plane 16, the trajectories or paths between the sectors 9 and 10 are symmetrical to those between sectors 8 and 9 in such a manner that the beam enters the sector 10 between the points J and K symmetric respectively to the points C and D, that is, that the angles of incidence at points J and K are respectively equal to the output angles at C and D, with the same respective deviations with respect to the axial stream.

By reason of this symmetry of incidence and the symmetric disposition of the pole pieces 7 with respect to the pole pieces 5, the trajectories or paths within the sector 10 are respectively symmetric to those within the sector 8. As a result thereof, the different lines or streams which enter the sector 10 between point J and K as convergent streams, are reconstituted at the output at L into a single stream perpendicular to the output face of pole pieces 7.

However, the trajectory ADGIKL is longer than the trajectory ACFHJL, particularly by reason of the greater length of the arc GI. The electrons of small energy, therefore, arrive at L delayed with respect to the electron of large energy. It follows therefrom that the electron stream leaving at L is in the form of chaplets of separate electron bunches, successive bunches having successively decreasing energies. Each chaplet of this nature corresponds to a bunch of mixed electrons of different energies in the axial stream ahead of the input at A.

It may be readily calculated that the difference of length between the path from point A to point L of electrons having an energy which deviates from the average energy E by $\Delta E$, and the axial trajectory followed by electrons of average energy E may be expressed as follows:

$$\Delta l = 2R \frac{\Delta E}{E} \left( 2 \sin \alpha - \frac{3\alpha}{2} \right) \tag{2}$$

This function of $\alpha$ is maximum for $\cos \alpha = 0.75$ which corresponds approximately to an angle of $\alpha = 41°30'$.

The separation between individual bunches of a chaplet is then maximum which justifies the selection of this value of $\alpha$ for the preferred mode of construction in accordance with the present invention.

It should also be noted that $\alpha$ should not exceed 60°, the angle for which the distance between the faces CD and FG would become zero.

An analogous bunching into chaplets also prevails for the electrons which are disposed outside the axis 14. It should also be noted that the focusing action in the plane of the sectors 8–10 obtained for the electrons of same energy with a focus in the plane 16 is obliterated by the symmetric defocusing system obtained along the portions of the trajectories or paths to the right of plane 16. Furthermore, the optical system is completely afocal in the plane perpendicular to the plane of FIGURE 1. At the output L, the beam, therefore, reassumes the same form as ahead of input at A, that is, it becomes cylindrical again since it was assumed that the beam was cylindrical at the input A.

FIGURE 3 illustrates a modified embodiment according to the present invention which offers a certain number of advantages as compared to the embodiment of FIGURE 1 even though it utilizes a larger number of magnets.

As in FIGURE 1, an electron accelerator 1 injects a beam having as its axis the sinusoidally shaped line 14 into a guide 4, composed alternately of linear portions and portions forming arcs of circles. The system according to FIGURE 3 utilizes four magnets 27, 28, 29 and 30 disposed symmetrically with respect to the plane 16. The geometric dimensions of the magnets 27–30 are identical and the form thereof is rectangular. The magnets 27–30 all provide the same field intensity but the polarity of the two center magnets 28 and 29 are inverse with respect to the end magnets 27 and 30 as indicated respectively by the encircled crosses and points designated by B. The portions of the guide 4 in the shape of arcs of circles are disposed within the field of these magnets 27–30, the input face of the magnet 27 being inclined under a predetermined angle $\alpha$ with respect to the normal or perpendicular to the direction of incidence of the axis 14 of the beam. By designating with reference numeral R the radius of curvature of the trajectory or path of the electrons of average energy level under the action of each of the magnets, a length $R \cdot \sin \alpha$ is then selected for the magnets as shown in FIGURE 3. Calculations indicate that in order for the system to be afocal in the plane perpendicular to the drawing, it is necessary that the distance between the output face of the magnet 27 and the input face of the magnet 28, these faces being parallel, is equal to $$2R\left(\frac{1}{\tan \alpha}-\alpha\right)$$

The same condition applies by reason of the symmetry to the magnets 29 and 30. The distance between magnets 28 and 29 is not critical and is determined primarily by the compromise between encumbering the system, on the one hand, and the non-interference of the outlying or bordering fields of adjacent magnets, on the other. The portions of the guide 4 having the shape of arcs of circles are limited by the angle $\alpha$, and the portions of the guide 4 between the magnets 28 and 29, ahead of the input of magnet 27 and behind the output of magnet 30 are parallel to one another. The two last-mentioned parallel portions are, therefore, aligned as a result of the symmetry of the system. Connected to the output of the magnet 30 is a utilization apparatus 18 as illustrated in the right part of FIGURE 1 which may be of any suitable construction and has, therefore, been shown only schematically.

By designating with $\Delta 1$ the separation realized between individual bunches of a chaplet of bunches formed in the electron beam, the following equation corresponding to Equation 2 for the system with three magnets applies to the system of FIGURE 3:

$$\Delta 1 = 4R\frac{\Delta E}{E}[2\sin \alpha - \alpha(1+\sin^2 \alpha)] \qquad (3)$$

in which E and $\Delta E$ have the same significance as in the preceding embodiment, namely designating the average energy and the deviation of energy with respect to the average energy.

The Equation 3 is a maximum for the value of $$\alpha = 30°40'$$

approximately, and $\alpha$ should not exceed 49°20′, the value for which the distance between magnets becomes zero.

For a desired $\Delta 1$ and a selected value of $\alpha$, the value for R may be readily derived therefrom, while the intensity for the magnetic field B may then be readily determined from Equation 1 indicated hereinabove.

The operation of the system shown in FIGURE 3 is the same as that of the system of FIGURE 1, the description of which is specifically referred to in connection therewith. The calculation of vertical aberration for the incident electrons parallel to the axis but having a deviation of energy with respect to the average energy level indicates that this aberration is very acceptable.

With respect to the system having three magnets, illustrated in connection with FIGURE 1, the embodiment according to FIGURE 3 offers the advantages that the magnets are no longer in sector-like shape but may be rectangular and, therefore, are relatively easier to manufacture. Additionally, the beam emerging from the separator is aligned with the incident beam and each magnet is strictly afocal in the plane of curvature of the beam no matter what the inclinations or energies of the incident beam. Furthermore, an assembly of two magnets on each side of the plane of symmetry is also strictly afocal in energy, for all incidences or energies, and the adjustment and control as regards the properties is possible for each magnet taken separately and for each of the assemblies on one side of the plane of symmetry.

Thus, notwithstanding the fact that the embodiment of FIGURE 3 utilizes a larger number of magnets, the system thereof might be considered preferable in actual utilization.

If the separator according to either FIGURE 1 or FIGURE 3 is followed by a travelling-wave type accelerator 18 the intensity and phase of the travelling wave field may be adjusted by acting on any conventional regulating means suitably provided therefor, for example, in the source of excitation 19. As a result of such adjustment, this travelling wave which propagates in synchronism with the beam will be in such phase relationship with the beam that the bunches having increasingly smaller energies, i.e., which are delayed with respect to the electron bunch of average energy E, are subjected to accelerating fields which are superior to that acting on the preceding bunch and which become more and more strong and, inversely, that the bunches having increasingly stronger energies, i.e., ahead of the bunch of average level E, are subjected to increasingly smaller fields or to fields having an opposite direction of the field acting on the bunch of average energy. This relation has been schematically illustrated in FIGURE 4 in which reference numeral 24 designates as dots bunches of electrons of a moving chaplet with an indication of corresponding energies, and in which reference numeral 25 designates the intensities of the positive or negative fields acting on the respective bunches with respect to and pertaining to a wave 26 which propagates in synchronism with the chaplet. As an illustration, the bunch of average energy E is subjected to the action of a slightly positive field of ordinate 25′. By suitably adjustably the intensity of the field, it is possible to realize an arrangement so that each energy $E \pm \Delta E_n$ receives an negative or positive additional term $E' \mp \Delta E_n$ where E′ is the energy due to the action of the field 25′ in such a manner that at the output of the accelerator 18 all of the electrons possess an energy of $E+E'$, that is, the beam thereby becomes mono-energetic.

It is understood that the position of the pole pieces of the separator with respect to the conduit 4 must be such as to be able to undergo adjustments experimentally to assume a position in actual operation deviating from the precise arrangement and location which has been indicated hereinabove. For that purpose, the magnets may be provided with any known means, for example, may be mounted on a carriage, or may be provided with adjustable faces on the side on the incidence or output side of the beam, or the like.

In the case in which the input beam is not cylindrical, it is always possible to obtain at the output a beam having the same shape by means of the possible modifications in the dimensioning and in the positioning thereof accessible to someone resorting to calculations by the use of the equations given hereinabove.

It is also understood that any arrangement of which the dimension satisfies the general principles set forth hereinabove is to be included within the scope of the present invention.

Thus, while we have shown and described only two embodiments in accordance with the present invention, it is understood that the same is not limited thereto but is susceptible of many changes and modifications within the spirit and scope of the present invention, and we, therefore, do not wish to be limited to the details shown and described herein but intend to cover all such modifications and changes as are encompassed by the scope of the appended claims.

We claim:

1. In a device for separating high-energy electrons in accordance with their energy levels, means for producing an electron beam containing electrons at different energy levels traveling at substantially equal velocities very nearly the velocity of light, a separator device disposed along the path of said beam comprising separator means including a plurality of magnets having essentially parallel lines of force, some of said lines being oppositely directed with respect to the others, said magnets being operative to bend said path in a plane perpendicular to said lines, whereby electrons having relatively lower energy levels move along longer paths than electrons having relatively higher energy levels, and to refocalize said paths of lower and higher energy electrons substantially in a common point, whereby said electrons are spatially spread into a chaplet, each electron having respectively a different energy level according to its position in said chaplet, and means for extracting said chaplet from said separator device.

2. In a device for separating high-energy electrons in accordance with their energy levels, means for producing an electron beam containing electrons at different energy levels travelling at substantially equal velocities very nearly the velocity of light, a separator device disposed along the path of said beam comprising separator means including a plurality of magnets having essentially parallel lines of force, some of said lines being oppositely directed with respect to others, said magnets being operative to bend said path in a plane perpendicular to said lines, whereby electrons having relatively lower energy levels move along longer paths than electrons having relatively higher energy levels and the electrons are grouped into a chaplet of electrons, each electron having respectively a different energy level, and means for extracting said chaplet from said separator device, said separator means including three magnets, the lines of force of the center magnet thereof being directed opposite to the lines of force of the two end magnets.

3. A device as claimed in claim 2, wherein said magnets are of sectoral shape, the incurvation of said sectors being alternately opposite with respect to said path.

4. A device as claimed in claim 3,, wherein said sector-shaped magnets are disposed to have respective mutually parallel symmetry planes.

5. A device as claimed in claim 4, further comprising means for positioning said beam with its axis substantially normally to a lateral face of one of said end magnets at a distance R from the center of the circle out of which said sector is cut out.

6. A device as claimed in claim 5, wherein the magnetic field strength B of said magnet is substantially determined by the equation of $$B.R = \frac{E}{3} \cdot 10^4$$

where B is in gauss, R in centimeters, and E is the average electron energy in mega-electron-volts.

7. A device as claimed in claim 6, wherein all three magnets have substantially the same field strength B and substantially the same dimensions and include a central angle $\alpha$, and wherein the distance between said symmetry planes is substantially equal to $$\frac{R}{2 \sin \frac{\alpha}{2}}$$

8. A device as claimed in claim 7, wherein the center of the circle out of which is cut out the central sector-shaped magnet is essentially at a distance of $$\frac{3R}{2 \cos \frac{\alpha}{2}}$$

from the line connecting the centers of the circles out of which are cut out the sector-shaped end magnets.

9. A device as claimed in claim 7, wherein said angle $\alpha$ is substantially equal to 41°30′.

10. In a device for separating high-energy electrons in accordance with their energy levels, means for producing an electron beam containing electrons at different energy levels travelling at substantially equal velocities very nearly the velocity of light, a separator device disposed along the path of said beam comprising separator means including a plurality of magnets having essentially parallel lines of force, some of said lines being oppositely directed with respect to the others, said magnets being operative to bend said path in a plane perpendicular to said lines whereby electrons having relatively lower energy levels move along longer paths than electrons having relatively higher energy levels and the electrons are grouped into a chaplet of electrons, each electron having respectively a different energy level, and means for extracting said chaplet from said separator device, said separator means including four magnets, the lines of force of the two center magnets being of the same sense and opposite to the lines of force of the two end magnets.

11. A device as claimed in claim 10, wherein said magnets are of rectangular shape, and are disposed in two pairs symmetrically arranged with respect to a common symmetry plane.

12. A device as claimed in claim 11, wherein said magnets of each pair have parallel faces, said faces being inclined under an angle $\alpha$ with respect to said symmetry plane.

13. A device as claimed in claim 12, wherein the magnetic field strength B of each magnet is substantially determined by the equation of $$B.R = \frac{E}{3} \cdot 10^4$$

where B is in gauss, R is the magnet width divided by sin $\alpha$ expressed in centimeters, and E is the average electron energy in mega-electron-volts.

14. A device as claimed in claim 13, wherein the distance between mutually facing faces of adjacent magnets of each pair is substantially equal to $$2R\left(\frac{1}{\tan \alpha} - \alpha\right)$$

15. A device as claimed in claim 13, further comprising means for positioning said beam at the plane of one face of one of said end magnets substantially in the direction normal to said common symmetry plane.

16. A device as claimed in claim 12, wherein said angle $\alpha$ is substantially equal to 30°40′.

17. In a device for separating high-energy electrons in accordance with their energy levels, means for producing an electron beam containing electrons at different energy levels travelling at substantially equal velocities very nearly the velocity of light, a separator device disposed along the path of said beam comprising separator means including a plurality of magnets having essentially parallel lines of force, some of said lines being oppositely directed with respect to the others, said magnets being operative to bend said path in a plane perpendicular to said lines, whereby electrons having relatively lower energy levels move along longer paths than electrons having relatively higher energy levels and the electrons are grouped into a chaplet of electrons, each electron having respectively a different high energy level, means for extracting said chaplet from said separator device, means for receiving said chaplet, means for compensating at least some of the electrons for the differences in energy of the respective electrons, and means for collecting the energy-compensated electrons in a substantially mono-energetic electron beam.

18. A separator adapted to separate magnetically high-energy electrons having different energy levels and travelling at substantially equal velocities very nearly the velocity of light and produced by an electron accelerator, comprising means forming a path for said electrons, and means disposed along said path for separating said beam into a chaplet of electrons including a plurality of magnets having essentially parallel lines of force directed with one polarity for a part of said plurality of magnets and with the opposite polarity for the remaining part to bend the electrons in said path along a plane essentially perpendicular to the lines of force thereof whereby electrons having relatively lower energy levels move along longer paths than electrons having relatively higher energy levels, and to refocalize said paths of lower and higher energy electrons substantially in a common point, whereby said electrons are spread into said chaplet, each electron having respectively a different energy level, according to its position in said chaplet, and means for extracting said chaplet from said separator.

19. A separator adapted to separate magnetically high-energy electrons having different energy levels and travelling at substantially equal velocities very nearly the velocity of light and produced by an electron accelerator, comprising means forming a path for said electrons, and means disposed along said path for separating said beam into a chaplet of electrons including a plurality of magnets having essentially parallel lines of force directed with one polarity for a part of said plurality of magnets and with the opposite polarity for the remaining part to bend the electrons in said path along a plane essentially perpendicular to the lines of force thereof whereby electrons having relatively lower energy levels move along longer paths than electrons having relatively higher energy levels and are spread into said chaplet, the electrons of said chaplet having respectively different energy levels, means for extracting said chaplet from said separator, and means for rendering said separator effectively afocal.

20. A separator according to claim 19, wherein said separator is effectively afocal in a plane perpendicular to the electron path.

21. A separator according to claim 20, wherein said separator is effectively afocal for all energy levels.

22. A separator adapted to separate magnetically high-energy electrons having different energy levels and travelling at substantially equal velocities very nearly the velocity of light, and produced by an electron accelerator, comprising means forming a path for said electrons, and means disposed along said path for separating said beam into a chaplet of electrons including a plurality of magnets having essentially parallel lines of force directed with one polarity for a part of said plurality of magnets and with the opposite polarity for the remaining part to bend the electrons in said path along a plane essentially perpendicular to the lines of force thereof whereby electrons having relatively lower energy levels move along longer paths than electrons having relatively higher energy levels and are spread into said chaplet, the electrons of said chaplet having respectively different energy levels, means for extracting said chaplet from said separator, and means connected to the output of said separator for producing with said chaplet an essentially mono-energy beam by equalizing the energy levels of said electrons.

23. A separator according to claim 22, wherein said means for producing an essentially mono-energy beam includes a travelling-wave type device providing interaction between a travelling wave and the electron bunches.

24. A separator according to claim 23, wherein said travelling-wave type device is an accelerator.

25. A separator adapted to separate magnetically high-energy charged particles having different energy levels and traveling at substantially equal velocities very nearly the velocity of light and produced by a charged particle accelerator, comprising means forming a path for said charged particles, and means disposed along said path for separating said beam into a chaplet of charged particles including a plurality of magnets having essentially parallel lines of force directed with one polarity for a part of said plurality of magnets and with the opposite polarity for the remaining part to bend the charged particles in said path along a plane essentially perpendicular to the lines of force thereof whereby charged particles having relatively lower energy levels move along paths of different lengths than the charged particles having relatively higher energy levels and to refocalize said paths of lower and higher energy charged particles substantially in a common point whereby said particles are spread into said chaplet, each particle having respectively a different high energy level according to its position in said chaplet, and means for extracting said chaplet from said separator.

26. A separator adapted to separate magnetically high-energy charged particles having different energy levels and travelling at substantially equal velocities very nearly the velocity of light and produced by a charged particle accelerator, comprising means forming a path of said charged particles, and means disposed along said path for separating said beam into a chaplet of charged particles including a plurality of magnets having essentially parallel lines of force directed with one polarity for a part of said plurality of magnets and with the opposite polarity for the remaining part to bend the charged particles in said path along a plane essentially perpendicular to the lines of force thereof whereby charged particles having relatively lower energy levels move along paths of different lengths than the charged particles having relatively higher energy levels and are spread into said chaplet, each particle having respectively a different high energy level, means for extracting said chaplet from said separator, means for receiving said chaplet of charged particles, means for compensating at least some of the particles to effect substantially the same energy level for all of said particles, and means for collecting the energy-compensated particles in a substantially mono-energetic particle beam.

27. A separator according to claim 22, further comprising means for increasing said reference level in said chaplet after extraction thereof from said output.

References Cited in the file of this patent

UNITED STATES PATENTS

| | | |
|---|---|---|
| 1,645,304 | Slepian | Oct. 11, 1927 |
| 1,911,976 | Strigel | May 30, 1933 |
| 2,157,585 | Zworykin et al. | May 9, 1939 |
| 2,175,697 | Nelson | Oct. 10, 1939 |
| 2,457,495 | Rochester | Dec. 28, 1948 |
| 2,563,197 | Sziklai et al. | Aug. 7, 1951 |
| 2,675,470 | Wideroe | Apr. 13, 1954 |
| 2,721,949 | Gund et al. | Oct. 25, 1955 |
| 2,743,366 | Hershberger | Apr. 24, 1956 |
| 2,808,510 | Norton | Oct. 1, 1957 |
| 2,882,396 | Courant et al. | Apr. 14, 1959 |
| 2,925,522 | Kelliher | Feb. 16, 1960 |